United States Patent Office 3,544,649
Patented Dec. 1, 1970

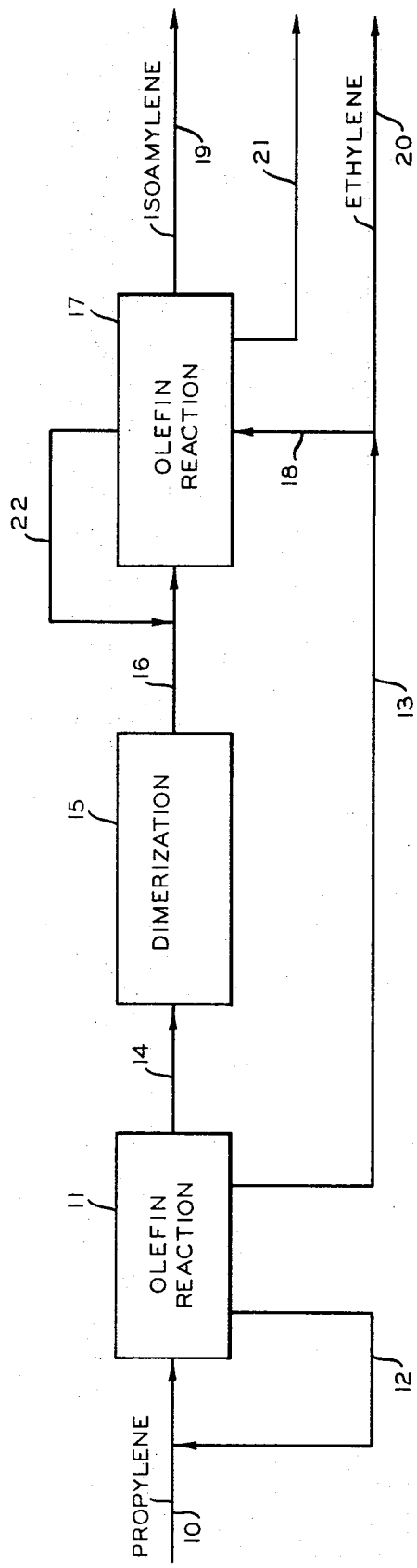

3,544,649
CONVERSION OF PROPYLENE TO ISOAMYLENE
Rolland E. Dixon and John F. Hutto, Bartlesville, Okla., assignors to Phillips Petroleum Company, a corporation of Delaware
Filed Nov. 8, 1967, Ser. No. 681,380
Int. Cl. C07c 3/62
U.S. Cl. 260—683                                                           6 Claims

ABSTRACT OF THE DISCLOSURE

An olefin hydrocarbon, for example, propylene, is converted to an isoamylene, by a three-step catalytic conversion process comprising disproportionating the propylene to produce ethylene and butene, separating the ethylene from the butene, dimerizing the butene to produce a branched dimer, and reacting the branched dimer and the ethylene in an olefin reaction zone to produce the isoamylene.

---

This invention relates to the conversion of olefin hydrocarbons. In one aspect it relates to preparing isoamylenes from propylene.

Isoamylenes are valuable hydrocarbons for the production of isoprene. The value of isoamylenes is considerably greater than that of propylene and therefore the propylene is upgraded to a more valuable hydrocarbon.

An object of this invention is to convert olefins. Another object is to prepare isoampylenes from propylene. Still another object is to provide a method which combines the olefin reaction with the dimerization reaction to convert propylene into isoamylenes which are then dehydrogenated to isoprene. Other aspects, objects and advantages of my invention will be apparent to one skilled in the art upon studying the disclosure including the detailed description of the invention and the drawing wherein:

The sole figure of the drawing is a schematic flow diagram of a preferred embodiment of the invention.

According to the process of the present invention an alpha olefin is disproportionated to produce an internal olefin and ethylene; the internal olefin is dimerized to produce branched dimers in a second step and the branched dimers are then reacted with some of the previously produced ethylene to produce lower boiling branched olefins in an olefin reaction wherein ethylene is used to cleave the branched dimers.

The invention is broadly applicable to the conversion of a feed alpha olefin into a branched chain olefin containing one carbon atom less than twice as many carbon atoms as the feed alpha olefin. Thus if propylene is the feed olefin the product olefin will be an isoamylene and if butene-1 is the feed olefin the product olefin will be an isoheptene.

In the first step of a preferred embodiment of the invention propylene is disproportionated in an olefin reaction by contact with an olefin reaction catalyst under conditions suitable to produce ethylene and butene-2. The butene-2 is dimerized to isooctenes which are then cleaved with ethylene to produce isoamylenes.

The term olefin reaction, as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction includes but is not limited to the following reactions:

(1) The disproportionation of an acyclic mono- or polyene having at least three carbon atoms into other acyclic mono- or polyenes of both higher and lower number of carbon atoms; for example, the disproportionation of propylene yields ethyleen and butenes; or (2) The conversion of ethylene and an internal acyclic mono- or polyene having four or more carbon atoms to produce other olefins having a lower number of carbon atoms than that of the acylic mono- or polyene; for example, the conversion of ethylene and 4-methylpentene-2 yields 3-methylbutene-1 and propylene.

The catalysts which are useful for the present invention are those which have activity for the disproportionation of propylene into ethylene and butanes. Some examples of heterogeneous catalysts are:

(1) Silica or thoria promoted by an oxide or compound convertible to an oxide by calcination or sulfide of tungsten or molybdenum or by an oxide or compound convertible to an oxide by calcination of rhenium or tellurium;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellerium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activaed by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Homogeneous catalysts which can be used in the present invention include those which can be represented by a transition metal-containing component:

(a) Represented by the formula $[(L)_a(L')_bM_cZ_d]_x$ wherein (L) and (L') are organic or inorganic ligands; M is a transition metal of Group I–B, III–B, IV–B, V–B, VI–B, or VII–B or the iron and cobalt subgroups of Group VIII; Z is halide or a radical such as CN, SCN, OCN, and $SnCl_3$; $a$ and $d$ are numbers 0–6, $b$ is 0–2, $c$ is 1–4; $x$ is a number indicative of the polymeric state of the compound; and wherein the number of (L), (L') and Z groups present in the component (a) compound shall not be greater than the number required for the metal to achieve the closed shell electronic configuration of the next higher atomic number inert gas. Preferred (L) groups are $R_3Q$, $R_3QO$, $R_2Q$—$QR_2$, $R_2NR'$, O, CO, NO, $R_2N$—$R^2$—$NR_2$, R—S—R,

$[\pi\!-\!(CHR^4\!=\!CR^4\!-\!CH_2)\!-\!]$, $(R^5(CN)_k$, $R^5(COO)_k$ $RCOR^6(COO)_k$, $[(RCO)_2CH]$, $(R_2NCSS)$ unsubstituted and $R^5$ group-substituted pyridine, unsubstituted and $R^5$ group-substituted bipyridine, or unsubstituted and R group-substituted cyclopentadienyl radicals; (L') ligands are NO or $[\pi\!-\!(CHR^4\!=\!CR^4\!-\!CH_2)\!-\!]$; wherein R is an aromatic or saturated aliphatic radical, including radicals substituted with groups such as halo groups or alkoxy groups and the like, having up to 20 carbon atoms; R' is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1–2; and (b) An aluminum-containing compound, (1) represented by the formula $RAlX_2$; or a mixture of (1) and a compound (2) represented by the formula $R_nAlX_m$ wherein R is as previously described; X is halogen; $n$ is 2 or 3; $m$ is 0 or 1; and the sum of $n$ and $m$ is 3.

Some specific examples of suitable transition metal complex (a) components are:

(triphenylphosphine)$_2$(NO)$_2$MoCl$_2$, (NO)$_2$MoCl$_2$
(pyridine)$_2$(NO)$_2$MoCl$_2$
NO-treated (triphenylphosphine)$_2$MoCl$_4$
NO-treated (pyridine)$_2$MoCl$_4$
NO-treated (butyronitrile)$_2$MoCl$_4$
NO-treated (stearate)$_2$MoCl$_3$
NO-treated pyridine-treated MoCl$_5$
NO-treated (benzoate)$_2$MoCl$_3$
NO-treated (acetylacetonate)$_2$MoO$_2$
NO-treated MoOCl$_3$
NO-treated tetrallyltin-treated MoCl$_5$
NO-treated MoCl$_5$
NOCl-treated pyridine-treated MoO$_2$
NO-treated tributylphosphine-treated MoCl$_5$
NO-treated thiophene-treated MoCl$_5$
NO-treated pyridine-treated WCl$_6$,
NO-treated benzoic acid-treated WCl$_6$
(triphenylphosphine)$_2$(NO)$_2$WCl$_2$
(triphenylphosphine)$_2$ReOCl$_3$
(triphenylphosphine)$_2$ReCl$_4$
(triphenylphosphine)$_2$ReOBr$_3$
(acetylacetonate)$_4$Re$_2$Cl$_4$
(triphenylphosphine)ReOBr$_3$
CO-treated triphenylphosphine-treated RuCl$_3$
NO-treated RuCl$_3$, NO-treated NO-treated RuCl$_3$
(triphenylphosphine)$_4$(CO)$_2$Ru$_2$(SnCl$_3$)Cl$_3$
NO-treated triphenylphosphine-treated RuCl$_3$
NOCl-treated(triphenylphosphine)$_3$RhCl
NO-treated (triphenylphosphine)$_3$RhCl
($\pi$-allyl)$_2$RhCl
NO-treated triphenylphosphine-treated RhCl$_3$
(triphenylphosphine)$_3$Cu$_2$Cl$_2$
(triphenylphosphine)AuCl
[(triphenylphosphine)AgBr]$_x$
(triphenylphosphine)Cr(CO)$_4$
(triphenylphosphine)$_2$MoCl$_4$, SmCl$_3$, ThCl$_4$, UCl$_3$
UCl$_4$, (cyclopentadienyl)TiCl$_3$
pyridine-treated TiCl$_4$, (acetylacetonate)$_4$Zr
NO-treated benzoic acid-treated NbCl$_5$
NO-treated (triphenylphosphine)$_2$CoCl$_2$
NO-treated triphenyl-phosphine-treated IrCl$_3$ and
NO-treated CO-treated triphenylphosphine-treated IrCl$_3$
and the like, and mixtures thereof.

Some specific examples of $RAlX_2$ compounds are: methylaluminum dichloride, ethylaluminum dichloride, n-butylaluminum dichloride, n-heptylaluminum dibromide, cyclohexylaluminum dibromide, 4-methylcyclohexylaluminum difluoride, n-eicosylaluminum difluoride, isopropylaluminum diiodide, benzylaluminum dichloride, 2,4,6-trimethylphenylaluminum dichloride, n-decylaluminum dichloride and 2-naphthylaluminum dichloride.

Some specific examples of $R_nAlX_m$ compounds are: tri-methylaluminum, triethylaluminum, tri-n-propylaluminum, triisobutylaluminum, tri-n-hexylaluminum, tri-n-octylaluminum, tricyclohexylaluminum, triphenylaluminum, tri-n-decylaluminum, tri-n-eicosylaluminum, methyldiphenylaluminum, tribenzylaluminum, tri-1-naphthylaluminum, di-n-octylphenylaluminum, tri-4-tolylaluminum, dimethylaluminum chloride, di-n-propylaluminum bromide, diethylaluminum chloride, diisobutylaluminum chloride, methylisobutylaluminum chloride, n-heptylaluminum fluoride, diphenylaluminum bromide, dibenzylaluminum chloride and di-n-octylaluminum iodide.

Referring now the drawing, propylene is passed via conduit 10 to reactor 11 where the propylene is contacted with a catalyst capable of disproportionating propylene to ethylene and butenes under conditions favorable for production of butene-2. The reactor effluent is separated by means not specifically shown, such as distillation; unreacted propylene is recycled via conduit 12; ethylene is passed via conduit 13; and the butene stream, principally butene-2 is passed via conduit 14 to dimerization reactor 15 containing a dimerization catalyst. In dimerization reactor 15 the butene-2 is dimerized to isooctenes and passed via conduit 16 to olefin reaction reactor 17 containing a catalyst suitable for producing a product of the olefin reaction. In reactor 17 ethylene via conduits 13 and 18 is passed into contact with the isooctenes and the catalyst and the ethylene cleaves the isooctene to form isoamylenes which are removed via conduit 19. Excess ethylene over that required in reactor 17 is removed via conduit 20. Heavy materials are removed via conduit 21. Unreacted isooctenes are recycled back to the feed via conduit 22.

The catalyst in olefin reaction reactor 11 can be any catalyst capable of disproportionating propylene to ethylene and butene but is preferably one which is fairly specific to producing butene-2, such as a heterogeneous catalyst which has been treated with an alkali metal or alkali metal hydroxide to eliminate acid sites on the catalyst and inhibit isomerization of the butene-2 to butene-1. An especially preferred catalyst is one containing about 1 to 30 weight percent of tungsten oxide on silica which has been treated to contain about 0.01 to about 2 weight percent of alkali metal. In one example, the catalyst in reactor 11 contains tungsten oxide on silica which has been treated to contain 0.14 weight percent alkali metal.

The dimerization catalyst in dimerization reactor 15 can be any conventional catalyst capable of dimerizing internal olefins into branched chain dimers of such olefins. Such catalysts include cobalt oxide on carbon or the complex formed by the 1:1 adduct from triiisopropylphosphine and π-allylnickel bromide with aluminum bromide. One preferred catalyst system is bis(triphenylphosphine)dichloronickel(II) and ethylaluminum dichloride. With this catalyst the reaction temperature will often be from 0 to 50° C. although it can be either higher or lower and residence time will be that required to give the desired conversion and will usually be in the range of 1 minute to about 2 hours. Another dimerization catalyst is a mixture of alkali metal and an alkali metal hydroxide. With such catalysts operating conditions are about the same as with the bis(triphenylphosphine)dichloronickel II catalyst system.

The catalyst in the reactor 17 can be the same as the catalyst in reactor 11 except that such catalyst would not be base treated and therefore would not contain the 0.14 weight percent alkali metal because in reactor 17 some isomerization is desirable.

In a system such as that illustrated in the drawing, propylene is heated to a temperature of about 1000 to 1070° F. and passed through reactor 11 containing a tungsten oxide-silica catalyst at 20 p.s.i.g. and at a gaseous hourly space velocity of 4800 v./v./hr. Unreacted proplylene is recycled to the feed, ethylene is removed and the butenes, being principally butene-2, are passed into contact with a bed of catalyst composed of a mixture of bis(triphenylphosphine)dichloronickel II and ethylaluminum dichloride in the ratio of about 1 mol of ethylaluminum dichloride to 5 mols of bis(triphenylphosphine)dichloronickel II at a temperature of about 100° F. and a residence time of about 2 minutes.

The effluent from the dimerization reaction is passed to the olefin cleavage reaction reactor under about the same operating conditions as in the propylene disproportionation reaction reactor.

The following material balance is representative of the above reactions:

TABLE I

| Stream No. | 10 | 13 | 14 | 16 | 18 | 20 | 21 | 19 |
|---|---|---|---|---|---|---|---|---|
| Olefin: | | | | | | | | |
| Ethylene | | 333 | | | 187 | 146 | | |
| Propylene | 1,000 | | | | | | | |
| Butenes-2 | | | 667 | | | | | |
| Isoamylenes | | | | 34 | | | | 742 |
| Normal pentene | | | | 3 | | | | 82 |
| Isohexenes | | | | 90 | | | | |
| Normal hexene | | | | 10 | | | | |
| Isooctenes | | | | 450 | | | | |
| Normal octene | | | | 50 | | | | |
| Heavies | | | | 30 | | | 30 | |
| Total | 1,000 | 333 | 667 | 667 | 187 | 146 | 30 | 824 |

The separation of the hydrocarbons in the above is usually done by distillation but can be done by a means such as fractional crystallization or chemical reaction. The above material balance shows that a unitary system is provided for converting propylene into isoamylenes in good yield in three relatively simple steps.

That which is claimed is:

1. A process for producing isoamylene which comprises:
    (1) contacting propylene with a catalyst, active for disproportionating propylene into ethylene and butenes, under conditions including conditions of temperature, pressure and contact time suitable to produce ethylene and butene-2 in a first olefin reaction step, the olefin reaction, as defined herein, being one which can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond;
    (2) separating the butene-2 from the ethylene and contacting the butene-2 with a dimerization catalyst under conditions, including conditions of temperature, pressure and contact time suitable to produce an isooctene;
    (3) contacting said isooctene with ethylene produced in said first olefin reaction step in the presence of a catalyst, active for disproportionating porpylene into ethylene and butenes, under conditions including conditions of temperature, pressure and contact time suitable to cleave the dimer and produce isoamylene in a second olefin reaction step; and
    (4) recovering the isoamylene as a product of the process.

2. The process of claim 1 wherein the catalyst in the first olefin reaction step is a heterogeneous catalyst which has been treated to eliminate acid sites to inhibit isomerization and the catalylst in the second olefin reaction step has not been treated to inhibit isomerization.

3. The process of claim 2 wherein the catalyst in the first olefin reaction step and the catalyst in the second olefin reaction step have a support selected from the group consisting of silica, alumina, aluminum phosphate, zirconium phosphate, calcium phosphate, magnesium phosphate and titanium phosphate promoted with a promoter selected from the group consisting of oxides, compounds convertible to an oxide by calcination and sulfides of tungsten and molybdenum, rhenium oxide, and hexacarbonyls of molybdenum and tungsten.

4. The process of claim 2 wherein the catalyst in the first olefin reaction step is a heterogeneous catalyst containing alkali metal.

5. The process of claim 4 wherein the catalyst in the first olefin reaction step comprises about 1 to 30 weight percent tungsten oxide associated with about 70 to 99 weight percent silica; and containing about 0.01 to about 2 weight percent of alkali metal; and the catalyst in the second olefin reaction step comprises about 1 to 30 weight percent tungsten oxide associated with about 70 to 99 weight percent silica.

6. The process of claim 5 wherein the catalyst in the dimerization zone is a mixture of bis(triphenylphosphine)dichloronickel II and ethylaluminum dichloride.

References Cited

UNITED STATES PATENTS

| 2,881,234 | 4/1959 | Esmay et al. | 260—683.15 |
| 3,261,879 | 7/1966 | Banks | 260—683 |
| 3,457,320 | 7/1969 | Stapp et al. | 260—683 |
| 3,459,825 | 8/1969 | Eberhardt et al. | 260—683.15 |
| 3,379,706 | 4/1968 | Wilke | 260—683.15 X |
| 3,365,513 | 1/1968 | Heckelsberg | 260—683 |

FOREIGN PATENTS 1,064,829  4/1967  Great Britain.

PAUL M. COUGHLAN, JR., Primary Examiner

U.S. Cl. X.R.

252—429, 431; 260—683.15